(12) United States Patent
Tothill et al.

(10) Patent No.: US 10,190,936 B2
(45) Date of Patent: Jan. 29, 2019

(54) MOBILE BRIDGE APPARATUS

(71) Applicant: BAE SYSTEMS plc, London (GB)

(72) Inventors: Ian Edward Tothill, Leeds (GB); Timothy John Davis, Leeds (GB)

(73) Assignee: BAE Systems plc, London (GB)

( * ) Notice: Subject to any disclaimer, the term of this patent is extended or adjusted under 35 U.S.C. 154(b) by 37 days.

(21) Appl. No.: 15/541,439

(22) PCT Filed: Jan. 4, 2016

(86) PCT No.: PCT/GB2016/050004
§ 371 (c)(1),
(2) Date: Jul. 3, 2017

(87) PCT Pub. No.: WO2016/110680
PCT Pub. Date: Jul. 14, 2016

(65) Prior Publication Data
US 2017/0363503 A1 Dec. 21, 2017

(30) Foreign Application Priority Data
Jan. 5, 2015 (GB) .................. 1500054

(51) Int. Cl.
*G01M 5/00* (2006.01)
*E01D 15/12* (2006.01)
*E01D 22/00* (2006.01)
*E01D 15/133* (2006.01)

(52) U.S. Cl.
CPC .......... *G01M 5/0008* (2013.01); *E01D 15/12* (2013.01); *E01D 15/124* (2013.01); *E01D 15/133* (2013.01); *E01D 22/00* (2013.01); *G01M 5/0041* (2013.01)

(58) Field of Classification Search
CPC ....... E01D 15/124; E01D 15/133; E01D 6/00; E01D 21/00; E01D 15/24; E01D 15/02; E01D 15/12; E01D 19/04; E01D 19/12
See application file for complete search history.

(56) References Cited

U.S. PATENT DOCUMENTS

| | | | |
|---|---|---|---|
| 294,606 | A | 3/1884 | Frits |
| 3,156,041 | A | 11/1964 | Gault |
| 3,499,179 | A | 3/1970 | Weld |
| 3,504,389 | A | 4/1970 | Longbottom |
| 4,075,727 | A * | 2/1978 | Sedlacek ............ E01D 15/133 14/14 |

(Continued)

FOREIGN PATENT DOCUMENTS

| | | |
|---|---|---|
| CN | 102720123 A | 10/2012 |
| DE | 19724771 C1 | 10/1998 |

(Continued)

OTHER PUBLICATIONS

International Preliminary Report on Patentability received for Patent Application No. PCT/GB2016/050004, dated Jul. 20, 2017. 7 pages.

(Continued)

*Primary Examiner* — Abigail A Risic
(74) *Attorney, Agent, or Firm* — Finch & Maloney PLLC

(57) ABSTRACT

A mobile bridge apparatus includes one or more mobile bridge modules and a plurality of sensors for sensing a deformation of the one or more mobile bridge modules.

20 Claims, 3 Drawing Sheets

(56) References Cited

U.S. PATENT DOCUMENTS

Figure 1:
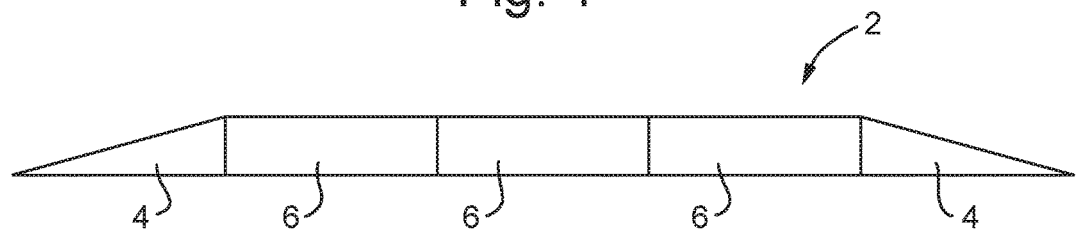

| | | | |
|---|---|---|---|
| 4,222,140 A * | 9/1980 | Olewinski | E01D 15/24 14/71.3 |
| 4,663,793 A | 5/1987 | Parramore | |
| 5,329,652 A * | 7/1994 | Wiedeck | E01D 15/127 14/2.5 |
| 5,398,462 A * | 3/1995 | Berlin | E01D 6/00 52/1 |
| 6,446,292 B1 | 9/2002 | Fuessinger et al. | |
| 9,279,221 B1 | 3/2016 | Orona et al. | |
| 2008/0061959 A1 * | 3/2008 | Breed | B60C 11/24 340/539.1 |
| 2009/0106918 A1 * | 4/2009 | Van Roosmalen | A61G 3/061 14/69.5 |
| 2010/0017975 A1 | 1/2010 | Kennedy et al. | |
| 2011/0119842 A1 * | 5/2011 | Park | B64F 1/3055 14/71.1 |
| 2011/0250014 A1 | 10/2011 | Corser | |
| 2012/0173150 A1 * | 7/2012 | Romero | G01S 13/885 702/14 |
| 2014/0309767 A1 * | 10/2014 | Liao | E01D 22/00 700/213 |
| 2015/0316426 A1 * | 11/2015 | Feichtinger | G01G 19/024 702/42 |
| 2016/0145815 A1 | 5/2016 | Motavalli et al. | |
| 2016/0171309 A1 * | 6/2016 | Hay | G06T 7/11 348/143 |
| 2017/0184550 A1 * | 6/2017 | Kobayashi | G01N 29/11 |

FOREIGN PATENT DOCUMENTS

| | | | |
|---|---|---|---|
| DE | 202010010909 U1 | | 1/2012 |
| EP | 0490771 A1 | | 6/1992 |
| EP | 0653616 A2 | | 5/1995 |
| EP | 0916769 A1 | | 5/1999 |
| GB | 1137278 A | | 12/1968 |
| GB | 2469752 A | | 10/2010 |
| JP | 2005030786 A | * | 2/2005 |
| JP | 2010144512 A | | 7/2010 |
| KR | 200444674 Y1 | | 5/2009 |
| KR | 20120050938 A | | 5/2012 |
| KR | 101344722 B1 | | 12/2013 |
| KR | 20140001586 A | | 1/2014 |
| WO | 2009126869 A2 | | 10/2009 |
| WO | 2016110680 A1 | | 7/2016 |
| WO | 2016110681 A1 | | 7/2016 |

OTHER PUBLICATIONS

International Preliminary Report on Patentability received for Patent Application No. PCT/GB2016/050005, dated Jul. 20, 2017. 8 pages.
International Search Report and Written Opinion received for Patent Application No. PCT/GB2015/050005, dated Mar. 30, 2016. 14 pages.
GB Intellectual Property Office Search Report under Section 17(5) received for GB Patent Application No. 1500054.0 dated May 28, 2015. 4 pages.
International Search Report and Written Opinion received for Patent Application No. PCT/GB2015/050004, dated Mar. 29, 2016. 9 pages.
GB Intellectual Property Office Search Report under Section 17(5) received for GB Patent Application No. 1500053.2 dated May 28, 2015. 4 pages.
Ghafoori, et al., "Fatigue strengthening of damaged metallic beams using prestressed unbonded and bonded CFRP plates," International Journal of Fatigue, vol. 44, Elsevier, 2012. pp. 303-315.
Taljsten, et al., "Strengthening of old metallic structures in fatigue with prestressed and non-prestressed CFRP aminates," Construction and Building Materials, vol. 23, Elsevier, 2009. pp. 1665-1677.

* cited by examiner

MOBILE BRIDGE APPARATUS

The present invention relates generally to a mobile bridge apparatus, and to a related method of managing (e.g. configuring) such an apparatus.

A mobile bridge apparatus might be used in a wide variety of applications, ranging from temporarily bridging a river or the like in the event of a failure of a permanent bridge, all the way through to the need to quickly and effectively bridge a gap or other obstacle in a military environment. In all applications, the mobile bridge apparatus will have an associated lifetime, the lifetime being dependent on the use of the mobile bridge apparatus. Typically, the lifetime of the mobile bridge apparatus as a whole will be in some way assessed and determined in advance.

A problem with existing mobile bridge apparatus and related management methods is that the pre-determined assessment of lifetime may be crude. This could lead to unintentional and potentially dangerous bridge failure during use. In other examples, the pre-determined assessment of lifetime may be conservative, in order to avoid such problems. However, in this instance this may lead to the mobile bridge apparatus, or a part thereof, being maintained and/or replaced unnecessarily. Finally, any pre-determined assessment of bridge lifetime will likely take into account typical use of the mobile bridge apparatus, or modules thereof, in a typical environment. In reality, it is clearly plausible that "typical" will have very little bearing as to how the mobile bridge apparatus is used in reality, and this might be particularly the case when the mobile bridge apparatus is deployed in various different demanding environments, with spontaneous and yet sporadic heavy periods of use (e.g. loading).

It is an example aim of example embodiments of the present invention to at least partially obviate or mitigate one or more of the disadvantages mentioned above or elsewhere in the prior art, or to at least provide an alternative to existing mobile bridge apparatus and related methods.

According to the present invention there is provided an apparatus and method as set forth in the appended claims. Other features of the invention will be apparent from the dependent claims, and the description which follows.

According to a first aspect of the invention, there is provided a mobile bridge apparatus, comprising: one or more mobile bridge modules; and a plurality of sensors for sensing a deformation of the one or more mobile bridge modules. The deformation, for example, might comprise or be related to stress or strain.

The sensor may sense, store and/or provide deformation information (e.g. data).

The apparatus may comprise more than one bridge module, and wherein at least two bridge modules each comprise a sensor.

At least one mobile bridge module may comprise at least two sensors at different locations of the bridge module.

The apparatus may comprise more than one bridge module, and wherein at least two bridge modules each comprise at least two sensors at different locations of the respective bridge module.

The one or more mobile bridge modules may comprise a plurality of ramp modules, and/or a plurality of inter-ramp modules. Each ramp module, and/or each inter-ramp module, may comprise one or more sensors.

An orientation of each of the one or more mobile bridge modules may be changeable (while still resulting in a functional module, in use); and/or the apparatus might comprise a plurality of mobile bridge modules, and the position of at least two of the modules might be interchangeable (while still resulting in functional modules, in use).

Each sensor may be arranged to store and/or transmit deformation information in the form of one or more of: sensed deformation; sensed deformation range, in terms of maximum and minimum deformation; and/or sensed deformation range, in terms of maximum and minimum deformation in a loading cycle; and/or cumulative deformation; and/or a count of deformation events that exceed a zero or non-zero threshold value.

The deformation information may include timing information linked to the or each (e.g. sensed) deformation.

Each sensor may be arranged to change from a relatively passive deformation sensing state to a relatively active deformation sensing state when a deformation exceeds a zero or non-zero threshold value.

Each sensor may be arranged to be interrogated in order to obtain deformation information from the sensor.

Each sensor may comprise or be connection with an indicator. The indicator may be controllable to change state dependent on the sensed deformation.

Each sensor may be bonded to a respective bridge module, optionally as part of a non-destructive reinforcement of that module.

Each sensor may be battery powered.

According to a second aspect of the invention, there is provided a method of managing (e.g. re-configuring in some way) a mobile bridge apparatus, the apparatus comprising: one or more mobile bridge modules; and a plurality of sensors for sensing a deformation of the one or more mobile bridge modules, the method comprising managing the mobile bridge apparatus based on deformation information obtained using the plurality of deformation sensors.

The managing might comprise one or more of: reorienting one or more mobile bridge modules; and/or repositioning one or more mobile bridge modules; and/or maintaining one or more mobile bridge modules; and/or replacing one or more mobile bridge modules.

It will be appreciated that any feature described in relation to any one aspect of the present invention may be used in combination with or in place of a feature of any other aspect of the present invention, unless such replacement and/or combination would be understood by the skilled person from a reading of the disclosure to be mutually exclusive. Such replacement/combination is particularly the case when features described in relation to an apparatus may be used as part of a related method, or where features of a method may be used as part of a related apparatus or in the use of that apparatus.

Figure 2:
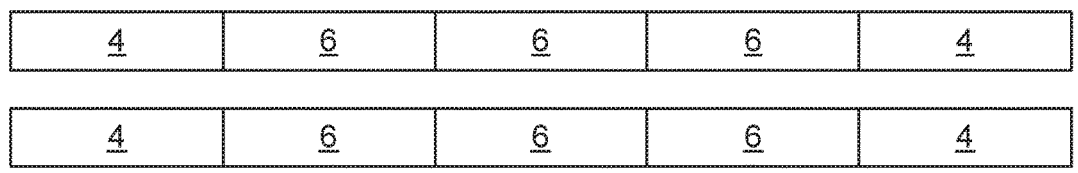
Figure 3:
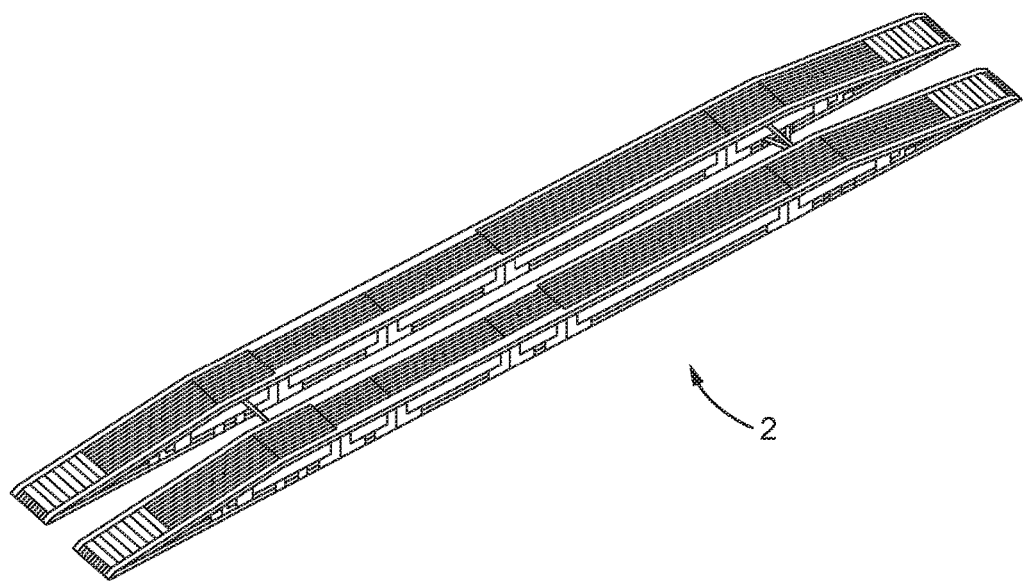
Figure 4:
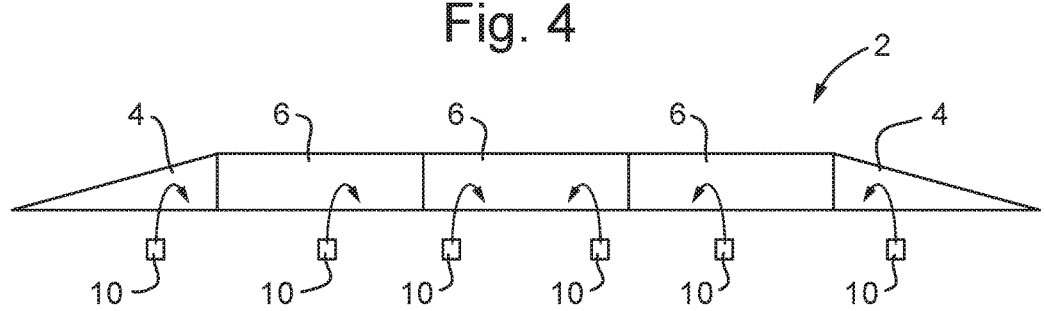
Figure 5:
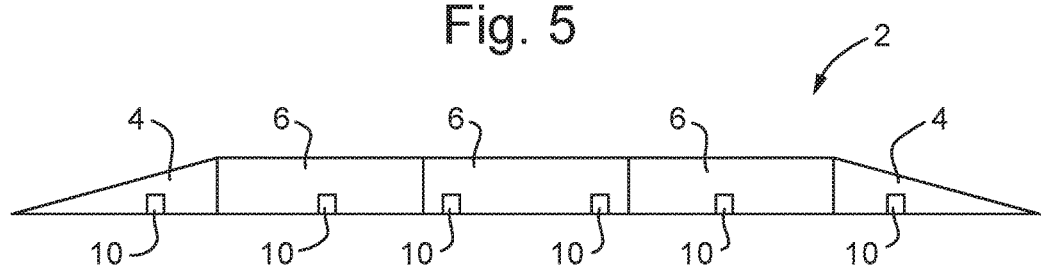
Figure 6:
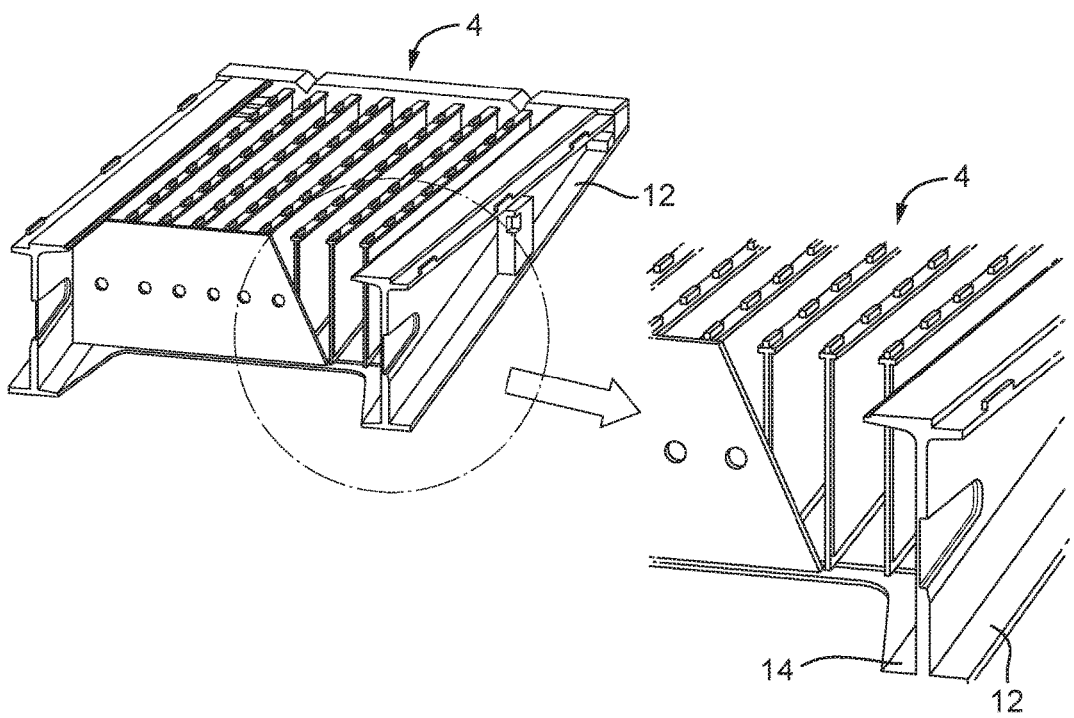
Figure 7:
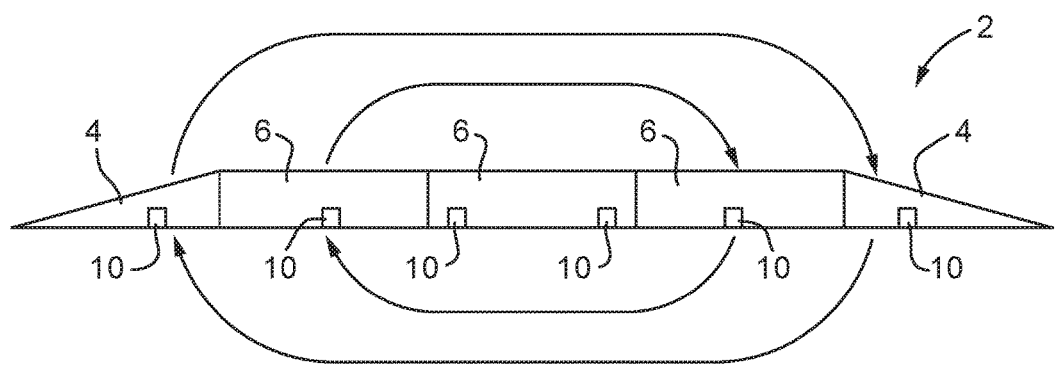
Figure 8:
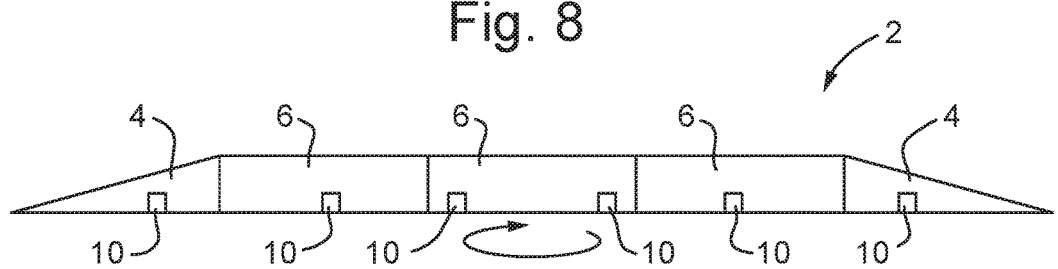
Figure 9:
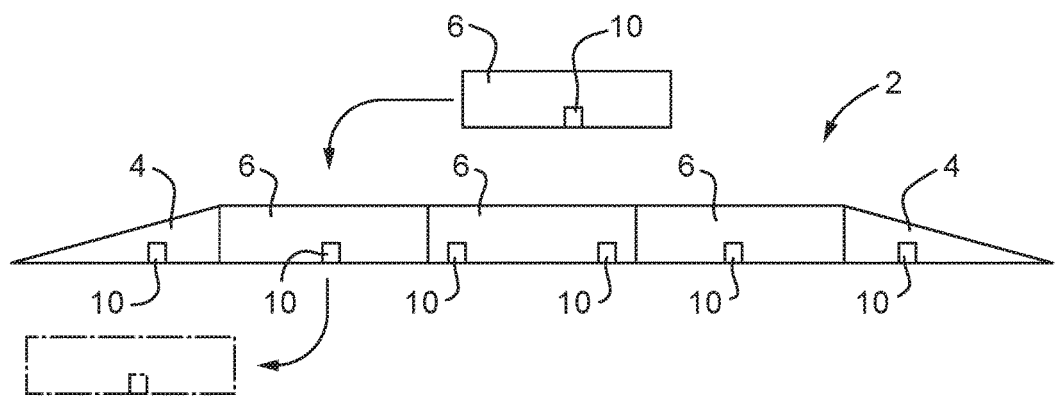

For a better understanding of the invention, and to show how embodiments of the same may be carried into effect, reference will now be made, by way of example, to the accompanying diagrammatic Figures in which:

FIG. 1 schematically depicts a side view of a mobile bridge apparatus;

FIG. 2 schematically depicts a plan view of the mobile bridge apparatus of FIG. 1;

FIG. 3 schematically depicts a perspective view of the mobile bridge apparatus of FIGS. 1 and 2;

FIG. 4 schematically depicts installation of sensors for sensing a deformation of one or more bridge modules of the mobile bridge apparatus of FIG. 1, in accordance with an example embodiment;

FIG. 5 shows the mobile bridge apparatus of FIG. 1 provided with sensors for sensing a deformation of the one or more mobile bridge modules, in accordance with an example embodiment;

FIG. 6 schematically depicts an example of a deformation sensor being installed on a mobile bridge module as part of a non-destructive reinforcement of that module, in accordance with an example embodiment;

FIG. 7 schematically depicts management of a mobile bridge apparatus in accordance with an example embodiment, in terms of re-positioning one or more mobile bridge modules of the mobile bridge apparatus;

FIG. 8 schematically depicts management of a mobile bridge apparatus in accordance with an example embodiment, in terms of re-orienting one or more mobile bridge modules of the mobile bridge apparatus; and FIG. 9 schematically depicts management of a mobile bridge apparatus in accordance with an example embodiment, in terms of replacing one or more mobile bridge modules of the mobile bridge apparatus.

The Figures have not been drawn to any particular scale, and are simply given as an aid to understanding concepts underlying and/or representing the invention. Also, the same features appearing in different Figures have been given the same reference numerals for consistency and clarity.

FIG. 1 schematically depicts a mobile bridge apparatus 2 in side view. The apparatus comprises ramp modules 4 connected together by inter-ramp modules 6. The modules 4, 6 are in connection with one another. The nature of the connection will depend on the nature of the specific type and use of the mobile bridge apparatus. For example, the modules 4, 6 may be in some way hingedly or foldably attached to one another for use in convenient deployment of the mobile bridge apparatus 2, for example from a vehicle or the like. In another example, the modules may be connected to one another via one or more cables or other elongate connectors. Other connection arrangements are of course possible.

The mobile bridge apparatus 2 may be used in a wide variety of applications, and might be used by people, animals, vehicles, and so on. The exact construction of the mobile bridge apparatus 2 may depend on its intended use. For example, there may be variations in terms of materials, structure, and so on. Many mobile bridge apparatus used to carry vehicles are made from an at least partial aluminium construction (e.g. a main frame or main structure of the apparatus), since aluminium is light but strong.

FIG. 2 shows a plan view of the apparatus of FIG. 1. The plan view reveals that the mobile bridge apparatus 2 may comprise two substantially parallel trains or series of modules 4, 6, for example for supporting different wheel or tracks of different sides of a vehicle. Although not shown in the Figure, the parallel trains or series of modules 4, 6 may be separate from one another, or attached to one another, and deployed at the same time, or separately. In another example, a parallel train or series of modules 4, 6 may not be required. That is, a single train or series of modules may suffice.

FIG. 3 shows the mobile bridge apparatus in perspective view, to give some more context to the overall look and function of the apparatus 2.

As already discussed above, there are numerous problems and disadvantages associated with allocating a pre-determined lifetime to a mobile bridge apparatus 2. Such a predetermined assessment and setting of the lifetime of the mobile bridge apparatus can lead to potentially dangerous situations if the mobile bridge apparatus is used more than assumed in the setting of a lifetime, or can lead to under use of the mobile bridge apparatus and related resources if the lifetime is set too conservatively. Generally, then, overall management of the mobile bridge apparatus could be greatly improved upon.

According to an example of implementation of the present invention, the problems discussed above can at least partially obviated or mitigated. In accordance with an example embodiment, in a mobile bridge apparatus comprising one or more mobile bridge modules, there is provided a plurality of sensors for sensing a deformation of the one or more mobile bridge modules. Deformation has an association with fatigue of a bridge, and thus its general use in an overall lifetime, or its use that can be used to determine that lifetime. The deformation, for example, might comprise or be related to stress or strain.

The invention is subtle but important, and extremely advantageous. By sensing deformation, the fatigue and real time life span of the mobile bridge module can be determined, or at least estimated more accurately, thus avoiding the predetermined lifetime assessments of previously existing mobile bridge apparatus and related methods. That is, the module and/or bridge as a whole can have its use, and thus cagey determined in real-time. This might be referred to as "lifing" of the module, or a part thereof.

The use of a plurality of sensors is, again, subtle but important. Using one or more sensors on each of more than one more module allows different modules of the apparatus to have their use and thus lifetime independently monitored in some way. This means that different modules can be managed in different ways, for example replacing a particular module, as opposed to a whole bridge, or even repositioning modules within the bridge apparatus, again leading to a better use of mobile bridge resources. Using more than one sensor for any one module gives additional information in the form of deformation at different locations of that module, which may allow for additional management functionality, for example allowing the module to be rotated to allow for further use of that module without failure risk to the mobile bridge apparatus as a whole.

FIG. 4 shows the mobile bridge apparatus 2 as already shown and described in reference to FIG. 1. FIG. 4 also shows the installation of deformation sensors in, or for, each of the modules 4, 6. One inter-ramp module 6 is provided with two sensors 10.

FIG. 5 shows the bridge apparatus with the installed sensors 10. In a slightly different embodiment, but employing the same principles, FIG. 5 could be viewed as an entirely new mobile bridge apparatus constructed with the sensors 10. That is, and in other words, the sensors 10 could be included during the construction of the mobile bridge apparatus and/or its modules, or the sensors 10 could be applied subsequently, for example in a retro-fitted manner.

The sensors 10 can be installed in any particular manner, for example by being part of or attached to a part of the respective module 4, 6. FIG. 6 shows a convenient way of retro-fitting the sensors 10, while at the same time achieving additional functionality.

FIG. 6 shows how a ramp module 4 of the mobile bridge apparatus may be non-destructively reinforced via use of a reinforcement element 12 that is bonded, or otherwise adhered or non-destructively attached to a portion 14 of the module 4 requiring reinforcement and/or deformation sensing. Conveniently, the sensor, or at least a part thereof, may constitute at least a part of the reinforcement element 12, all being installed at the same time as, or as part of, the installation of that reinforcement element 12. The convenience lies in timing, in that two functions are achieved in one method step, and also in that the location of the reinforcement is likely to be in a same or similar location as the sensor. That is, it is likely that a part of the bridge module that is subjected to most deformation, therefore requiring reinforcement, is also likely to be a critical part of the bridge module for the assessment of fatigue.

Non-destructive reinforcement means that the structure of the module 4 is not damaged during the reinforcement, for example by making one or more holes, cuts or weakenings in material forming the module. Bonding/adhering is a convenient way of non-destructively reinforcing.

At least a part of the sensor may be located in or attached to the reinforcement element, as mentioned above. The sensor, or a part thereof, might be located within a laminate form of reinforcing element, or on such an element, and so on.

As alluded to above, irrespective and independent of any reinforcement that may/may not be required, it is likely that a good place to locate a sensor for sensing deformation and thus fatigue of a module will be in or on a critical part of the module where deformation and thus fatigue is likely to be high and/or of importance to the structural integrity of the bridge. Depending on the construction of the bridge, this might be a location on a lower part or underside of a module, where tension/strain might be highest. Another location might be a cross-strut or main edge or face of the module.

So far, the sensors and their function have been only generically defined and described. A more detailed discussion of the sensors will now follow.

A sensor could be a unit or the like that is arranged to sense deformation of the mobile bridge module at a particular location. Alternatively or additionally, the sensor could be a unit or the like that comprises a network or similar of sub-sensors, information from which sub-sensors at (by definition) different locations can be independently obtained and processed or the like. Alternatively, multiple sensors at different locations might generally be described as a single sensor in at least some examples. So, the sensor could comprise sub-sensors, or could be understood as a single sensor that senses deformation at one or more different locations. In another example, sensing at different location might be undertaken by, or understood to be by, different sensors.

Sensing might be achieved in one or more axis, using one or more sensors.

The sensors have been described as sensing deformation of the mobile bridge module. The deformation could be dynamic and/or static deformation, for example comprising or being related to stress or strain. The deformation could be elastic, plastic or a fracture, although a plastic or fracture deformation will likely not be present in normal use. The sensing of strain may be particularly important in the determination of the fatigue of the module, and thus useful in determining a real indication of the age, life or lifespan of the particular module, which includes an indication of the overall use or usage of the module.

The sensors might take any suitable form. The suitability of the form might be dependent on the environment in which the mobile bridge apparatus is to be used. In any event, examples sensors might be based on optical fibre technology, magnetorestrictive technology, shape memory alloy technology and so on. A preferred type of sensor might be or comprise an electrical (as opposed to optical) strain gauge. Such an electrical strain gauge is a mature and robust technology, and is well suited to environments in which a mobile bridge might be used, for example a military environment. Also, being a mature technology, commercial-off-the-shelf sensors may be used, which might keep installation and maintenance costs down.

Typically, each sensor will be battery powered in some way, so that there is no need to provide a cabled power supply to the mobile bridging apparatus, which might otherwise compromise mobility. In order to conserve battery life, each sensor may be arranged to change from relatively passive state to a relatively active state (e.g. a deformation sensing state) when a deformation exceeds a zero or non-zero threshold value. For instance, this might avoid the sensor sensing (and/or storing or transmitting) relatively minor vibrations or movements of the bridge, and ensure that only significant deformation of the module is sensed for use/age/life determining purposes.

Each sensor may be arranged to store and/or transmit deformation information using a storage and transmitter, respectively.

Deformation information (e.g. data) may take the form of one or more of (which includes a combination of any one or more of) sensed deformation; sensed deformation range, in terms of maximum and minimum deformation (e.g. overall, or within a certain period of time); and/or sensed deformation range, in terms of maximum and minimum deformation in a loading cycle (e.g. when an object, or one or more objects, or the like, passes over the mobile bridge apparatus to cause deformation in or of the module); and/or cumulative deformation (e.g. a total plastic deformation, or a total of repeated elastic deformations); and/or a count of deformation events that exceeded zero or non-zero threshold value. In different ways, depending on different ways in which the deformation information may be used, each of these types of information may be particularly useful. This information might be even more useful when deformation information includes timing information linked to the or each deformation, for example a time or date when the deformation occurred, or a period of time over which the deformation occurred, and so on. The information might also include temperature (e.g. using a temperature sensor) and/or location (e.g. via GPS or similar).

In addition to, or as part of, using deformation information to determine an age/life of a bridge module, other uses are possible. The information could be used to determine severity of one off impact events, for example a vehicle which crosses the bridge or module at speed. The information could be used to determine if the mobile bridge or its modules has/have been seated, laid down or deployed in a favourable configuration—e.g. to determine if the load is spread well across those modules that are in contact with the ground. The information could be used to determine if reinforcement, as discussed above, is required. The deformation information discussed previously may be useful in isolation or in combination, or may be even more useful when processed using particular algorithms to determine a real-time indication of the age or lifespan of the mobile bridge module, and/or groups of modules, and/or the mobile bridge apparatus as a whole.

In connection with prior art mobile bridge apparatus and related management methods, it may be known that after a typical period of use under typical circumstances, a mobile bridge module may be somewhere within the range of 50%-75% of its pre-determined total lifespan. However, the actual usage of the module may not correspond to the actual life of the module being in this range, and even if in this range, there is still some significant room for error. As already discussed in some detail above, the error can lead to a dangerous situation, or under-use of a module. Using much more accurate sensing of the deformation in real-time avoids these problems, for example allowing a much more accurate current age of the module to be determined and/or indicated—e.g. 63%. For example, algorithms may be employed that can take deformation data and output an indication of overall use relative to a total/typical lifetime. The age will change depending on use. It is known that maximum and minimum deformation in a loading cycle is most important in accurately determining overall use and age of the module, as opposed to, for instance, an average or total static or dynamic deformation.

As discussed previously, each sensor may store and/or transmit deformation information. Each sensor may have this capability in isolation, or may have this capability by being in connection with one or more peripheral or central storage or transmission units. For instance, the information may be stored locally on each sensor, and each centre can be interrogated continuously or periodically by an external, remote management unit or similar. Alternatively and/or additionally, each sensor may transmit information to such a remote management unit or similar, again periodically or continuously (e.g. during a loading cycle).

An advantage of implementing the deformation sensors in the manner described is that a near real-time understanding of the usage of the mobile bridge modules, and thus their age/lifespan can be undertaken, which allows the mobile bridge module to be far more accurately used and managed etc. At least a part of this management might be undertaken remotely, for example by interrogating or otherwise obtaining information from the sensors in order to manage the bridge modules or overall bridge apparatus, for example in terms of the positioning of its modules, the orientation of its modules, or the maintenance or replacement of its modules. Management might take place in real-time, or periodically when a bridge is subjected to deployment, or preparation for such deployment.

Management might be undertaken more locally, and perhaps even in-situ in the field. Local, and more hands-on management, might be undertaken more readily, if and when each sensor comprises or is in connection with an indicator. The indicator might be controllable to change state dependent on the sensed deformation. For example, the indicator might be visual in nature, and indicate when an age of the module, or part thereof, or more crudely when a particular lifetime of the module or part thereof has been reached or exceeded. If multiple sensors are used on a module, an indicator for that module may be useful in orienting or re-orienting that module, for example indicating a direction in which the module should be oriented to increase overall lifetime. An indicator may be used or controlled in some way relative to other indicators. For example, multiple indicators on multiple modules may be used to provide an ordering of modules in the apparatus as a whole. This might be at least party achieved via communication between sensors, or communication via a remote management unit.

FIG. 7 shows how the mobile bridge apparatus 2 can be managed (which might be described as configured or re-configured) by re-positioning ramp modules 4 and/or inter-ramp modules 6. For instance, such re-positioning might be needed or useful if it is noticed that one ramp module 4 is being fatigued more readily than another ramp module 4, or that an inter-ramp module 6 is being fatigued more than another inter-ramp module 6.

FIG. 8 shows how an inter-ramp module 6 may be re-oriented if the fatigue of the module 6 is asymmetric. The reorienting might take the form of simply rotating the module 6 180° if the module has such structural symmetry.

If a bridge module 6 comprises more than one sensor 10, each of the two or more sensors will be located in some way to provide orientational indications, hints or guidance as to the orientation or suitable orientation of the module 6. For instance, sensors may be located on substantially opposite portions, or sides, or faces, or components of the respective module 6. More than two sensors 10 may be used, for example one in each corner, at each side, or face of the module, may give even more accurate results as to the asymmetric fatiguing of the module 6.

FIG. 9 shows how an inter-ramp module 6 may be removed for maintenance or replacement in accordance with the determined lifetime or age of the module 6.

The invention is advantageously applied such that the age or current life of individual modules within a mobile bridge apparatus can be more accurately determined. The invention is even more useful if an orientation of one or more of the mobile bridge modules is changeable and/or, when the apparatus comprises a plurality of mobile bridge modules, the position of at least two of the modules is interchangeable, since this allows for the flexibility of re-positioning and/or re-orienting to be used in conjunction with the more accurate determination of the age of the bridge module. To that extent, some, most or all of the bridge modules may comprise at least one strain sensor, or more than one sensor (which includes sensing location, as discussed above) if orientation information is required.

The invention as a whole, then, is synergistic in combining the benefits of the modular nature of the components of the mobile bridge apparatus, which can be and typically are re-configurable by re-positioning/re-orienting, together with the more advanced and accurate aging information provided in accordance with the invention, which allows the re-configuring (management) to be taken to a far more useful extent than currently possible.

The mobile bridge described herein is typically employed in (i.e. is capable of, and configured to be used in) a spanning capacity, for example spanning a gap or similar. Therefore, the bridge is able to support its own weight while still providing the spanning function. This is in contrast with, say, a pontoon bridge, where water supports the pontoon bridge. The bridge described herein will typically be free of any inter-gap supports, for example legs or otherwise, extending from the main bridging surface to a floor of the gap. That is, the bridged described herein is supported only on either side of the gap. The modules described herein are typically of a construction, for example a predominantly metallic construction, which is designed specifically for such a gap-spanning function. The construction is such that each module/the bridge as a whole would be incapable of floating in water without dedicated and separate floats or similar.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A mobile bridge apparatus, comprising:
   a plurality of mobile bridge modules each configured to form a portion of a bridge and to be in connection with one another; and
   a plurality of sensors, each of the sensors being located at different locations on at least one of the mobile bridge modules and configured to sense a deformation of each respective mobile bridge module.

2. The apparatus of claim 1, wherein each of the mobile bridge modules includes a plurality of ramp modules, and/or a plurality of inter-ramp modules, and wherein each ramp module, and/or each inter-ramp module, includes one or more sensors.

3. The apparatus of claim 1, wherein at least two of the bridge modules each includes at least two sensors at different locations of the respective bridge module.

4. The apparatus of claim 1, wherein
   an orientation of each of the mobile bridge modules is changeable.

5. The apparatus of claim 1, wherein each of the sensors is arranged to store and/or transmit deformation information in the form of one or more of:
   sensed deformation;
   sensed deformation range, in terms of maximum and minimum deformation;
   sensed deformation range, in terms of maximum and minimum deformation in a loading cycle;
   cumulative deformation; and/or
   a count of deformation events that exceed a zero or non-zero threshold value.

6. The apparatus of claim 5, wherein the deformation information includes timing information linked to the deformation.

7. The apparatus of claim 1, wherein each sensor is arranged to change from a relatively passive deformation sensing state to a relatively active deformation sensing state when a deformation exceeds a zero or non-zero threshold value.

8. The apparatus of claim 5, wherein each sensor is configured to be interrogated to obtain deformation information from the sensor.

9. The apparatus of claim 1, wherein each sensor includes or is connected with an indicator, the indicator being controllable to change state dependent on the sensed deformation.

10. The apparatus of claim 1, wherein each sensor is bonded to a respective one of the mobile bridge modules.

11. The apparatus of claim 1, wherein each sensor is battery powered.

12. A method of managing a mobile bridge apparatus, the comprising:
   managing the mobile bridge apparatus based on deformation information obtained using a plurality of sensors,
   wherein the mobile bridge apparatus includes:
      a plurality of mobile bridge modules configured to form a portion of a bridge and to be in connection with one another, and
      the plurality of sensors, each of the sensors being located at different locations on at least one of the mobile bridge modules and configured to sense a deformation of each respective mobile bridge module.

13. The method of 12, wherein the managing comprises one or more of:
   reorienting at least one of the mobile bridge modules;
   repositioning at least one of the mobile bridge modules;
   maintaining at least one of the mobile bridge modules; and/or
   replacing at least one of the mobile bridge modules.

14. The apparatus of claim 1, wherein each sensor is bonded to a respective one of the mobile bridge modules, as part of a non-destructive reinforcement of that module.

15. A mobile bridge apparatus, comprising:
   a plurality of mobile bridge modules configured to form a portion of a bridge and to be in connection with one another; and
   a plurality of sensors, each of the sensors being located at different locations on at least one of the mobile bridge modules and configured to sense a deformation of each respective mobile bridge module, wherein each sensor is bonded to a respective one of the mobile bridge modules, as part of a non-destructive reinforcement of that module, and wherein each sensor is battery powered and configured to be interrogated to obtain deformation information from the sensor.

16. The apparatus of claim 15, wherein each sensor is configured to store and/or transmit deformation information usable for assessing structural integrity of the mobile bridge apparatus once deployed.

17. The apparatus of claim 15, wherein the deformation information includes timing information associated with a given deformation.

18. The apparatus of claim 15, wherein each sensor includes or is connected with an indicator, the indicator being controllable to change state dependent on the sensed deformation.

19. The apparatus of claim 1, wherein positions of at least two of the modules are interchangeable.

20. The apparatus of claim 5, wherein the deformation information for at least one of the mobile bridge modules is used in combination with the deformation information for at least one other mobile bridge module to determine an age/life of the respective mobile bridge modules and/or a group of the mobile bridge modules and/or the bridge apparatus as a whole.

* * * * *